Figure 1:
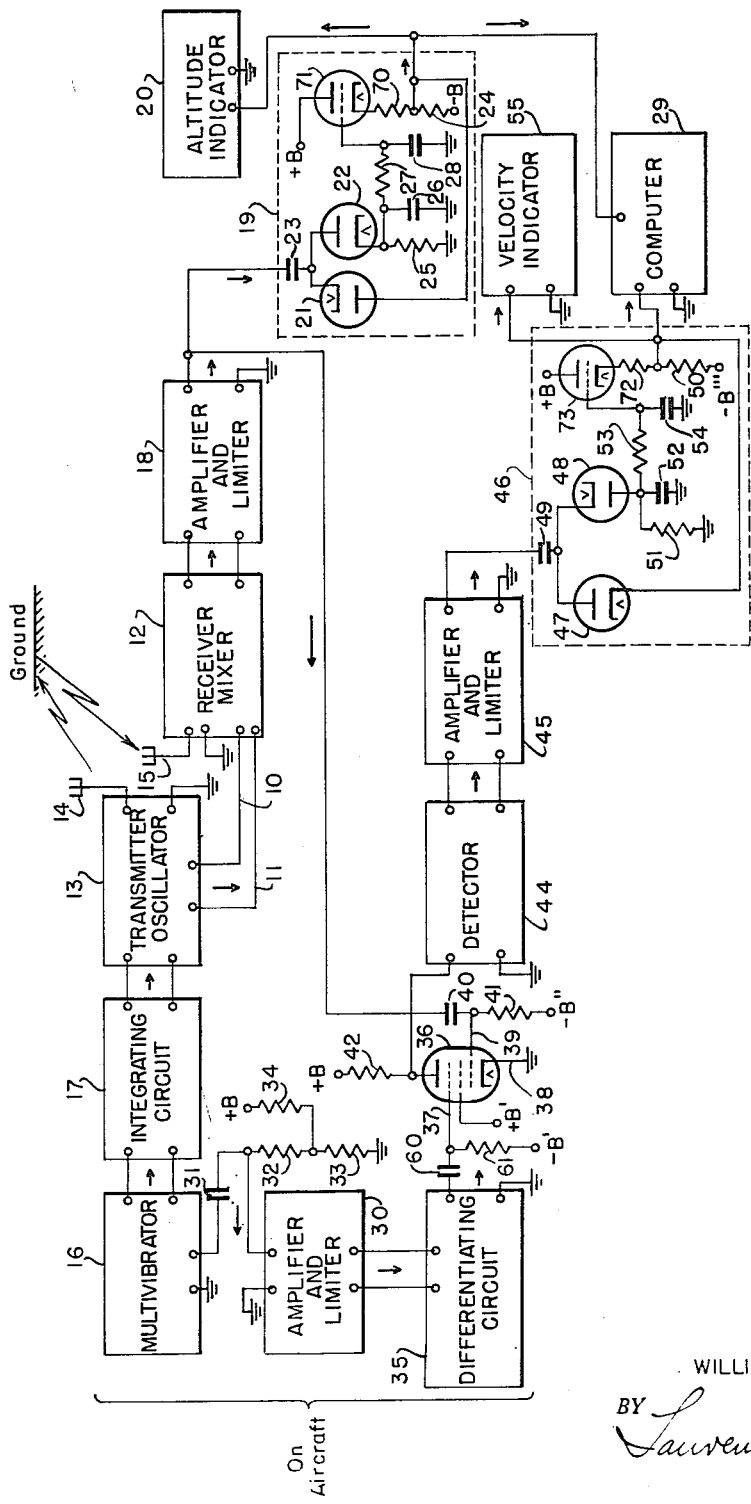

United States Patent Office 2,711,529
Patented June 21, 1955

2,711,529
SYSTEM FOR DEVELOPING A SIGNAL REPRESENTATIVE OF VELOCITY

William J. Shanahan, Long Island City, N. Y., assignor to Hazeltine Research, Inc., Chicago, Ill., a corporation of Illinois Application December 26, 1951, Serial No. 263,431

13 Claims. (Cl. 343—9)

General

The present invention relates to systems for developing a signal representative of velocity and, more particularly, to systems of the type which utilize an altimeter of the frequency-modulated wave-signal reflection type mounted on an aircraft to provide a signal representative of the distance between the aircraft and the ground and the invention will be specifically described in such an environment.

One system heretofore proposed for developing a signal representative of velocity and, particularly, for developing a signal representative of the vertical component of the velocity of an aircraft with respect to the ground, utilizes a transmitter which transmits to the ground a signal having a fixed frequency and a receiver responsive to the transmitted signal and to a signal reflected from the ground in response thereto. In accordance with the well-known Doppler principle, by beating together the transmitted and the reflected signals, the system derives a heterodyne signal having a frequency representative of the velocity of the aircraft with respect to the ground. However, in a system utilizing an altimeter of the frequency-modulated wave-signal reflection type, in which the frequency of the transmitted signal sweeps across a range of frequencies, the frequency of the heterodyne signal represents the distance between the aircraft and the ground and not the velocity of the aircraft with respect to the ground, because the frequency of the heterodyne signal is determined by the time required for the transmitted signal to reach the ground and be returned therefrom to the aircraft. Accordingly, the system described above for deriving velocity information in accordance with the Doppler principle cannot readily be utilized with an altimeter of the frequency-modulated wave-signal reflection type.

In altimeters of the frequency-modulated wave-signal reflection type, a unidirectional signal having a magnitude which varies with altitude usually represents the altitude of the aircraft. It has been found that differentiation of the unidirectional signal representing altitude does not provide a signal representing velocity sufficiently accurately, particularly in those applications wherein the last-mentioned signal is, in turn, differentiated again to provide acceleration information. Accordingly, systems utilizing differentiating circuits to provide signals representing velocity are not entirely satisfactory for many applications.

It is an object of the present invention, therefore, to provide a new and improved system for developing a signal representative of velocity which avoids the above-mentioned disadvantages of such systems heretofore proposed.

It is another object of the invention to provide a new and improved system for developing a signal representative of the magnitude of a predetermined component of the velocity of the system with respect to a relatively moving object.

It is another object of the invention to provide a new and improved system for use on an aircraft for developing a signal representative of the magnitude of the vertical component of the velocity of the aircraft with respect to the ground.

It is a further object of the invention to provide a new and improved system for use on an aircraft utilizing an altimeter of the frequency-modulated wave-signal reflection type, for developing a signal representative of the magnitude of the vertical component of the velocity of the aircraft with respect to the ground.

It is still another object of the invention to provide a novel system for use on an aircraft utilizing an altimeter of the frequency-modulated wave-signal reflection type, for developing a signal sufficiently accurately representative of the magnitude of the vertical component of the velocity of the aircraft with respect to the ground to allow the derivation of accurate acceleration information therefrom.

In accordance with a particular form of the invention, a system for developing a signal representative of the magnitude of a predetermined component of the velocity of the system with respect to a relatively moving object comprises a first wave-signal source having a frequency which recurrently sweeps over a range of frequencies and circuit means for supplying a second wave signal having a frequency which recurrently sweeps over the aforesaid frequency range and which differs instantaneously from the frequency of the first signal by an amount representative of the distance between the system and the object. The system includes a circuit responsive jointly to the aforesaid signals for deriving therefrom a signal having a frequency representative of the distance between the system and the object and having a rate of change of phase from one predetermined reference time occurring during one of the aforesaid sweeps of the first signal to another reference time occurring during another of the aforesaid sweeps thereof representative of the magnitude of the above-mentioned component of velocity. The system also includes circuit means coupled to the aforesaid responsive circuit for sampling the phase-time characteristic of the derived signal during several sweeps to develop a signal representative of the magnitude of the afore said component of velocity.

For a better understanding of the present invention, together with other and further objects thereof, reference is had to the following description taken in connection with the accompanying drawings, and its scope will be pointed out in the appended claims.

Figure 2:
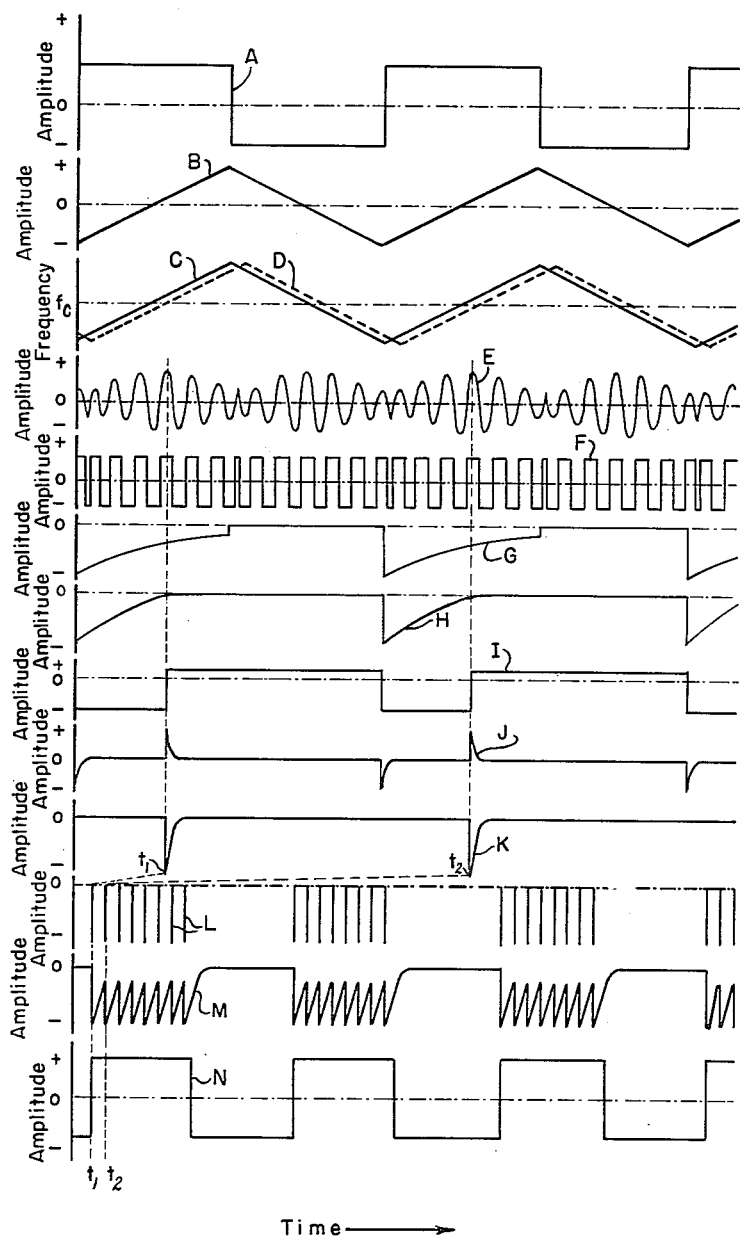

In the accompanying drawings, Fig. 1 is a circuit diagram, partly schematic, of a complete system for developing a signal representative of velocity in accordance with a particular form of the invention; while Fig. 2 is a graph utilized in explaining the operation of the Fig. 1 system.

Description of Fig. 1 system

Referring now more particularly to Fig. 1 of the drawings, there is represented a system constructed in accordance with the invention for developing a signal representative of the magnitude of a predetermined component of the velocity of the system with respect to a relatively moving object. The system preferably is one which may be mounted on an aircraft for developing a signal representative of the magnitude of the vertical component of the velocity of the aircraft with respect to the ground. The system includes a first wave-signal source having a frequency which recurrently sweeps over a range of frequencies and circuit means for supplying a second wave signal having a frequency which recurrently sweeps over the aforesaid frequency range and which differs instantaneously from the frequency of the first signal by an amount representative of, and ordinarily proportional to, the distance between the system and the relatively moving object. Specifically, the first wave-signal source preferably includes a transmitter oscillator 13 having an antenna system 14 for transmitting the first wave signal to the relatively moving object. The second wave-signal supply-circuit means preferably includes an antenna system 15 coupled to an input circuit of a receiver mixer 12 for intercepting the second wave signal which comprises a signal returned from the object in response to the transmitted signal. The receiver mixer 12 preferably is a crystal mixer of a usual type and the transmitter oscillator 13 also may be of conventional construction and comprise, for example, a reflex klystron oscillator. The first wave-signal source also includes, for example, a transmission line 10, 11 which couples the transmitter oscillator 13 to an input circuit of the receiver mixer 12.

A free running multivibrator 16 of conventional construction is coupled to an input circuit of the transmitter oscillator 13 through a suitable integrating circuit 17 for integrating the output signal of rectangular wave form of the multivibrator to provide a modulating signal of triangular wave form which is applied as a frequency-modulating signal to unit 13 periodically to sweep the frequency of its output signal over the aforesaid frequency range.

The system also includes a circuit responsive to the above-mentioned transmitted and intercepted wave signals comprising, for example, the receiver mixer 12 for deriving therefrom a signal which preferably is a heterodyne signal having a frequency representative of the distance between the system and the relatively moving object and having a rate of change of phase from one predetermined reference time to another representative of the magnitude of the aforesaid predetermined component of velocity. As will be explained hereinafter, each of the reference times preferably has a predetermined time relation to the initiation of a recurrent frequency sweep of the first signal, that is, each of the reference times preferably is delayed by a predetermined time interval from the initiation of a recurrent frequency sweep of the first signal.

It will be understood that the sources of the first and second signals and the deriving circuit comprising the transmitter oscillator 13, the antenna system 15 and the receiver mixer 12, when mounted on an aircraft as represented in Fig. 1, ordinarily are included in an altimeter of the frequency-modulated wave-signal reflection type for transmitting vertically downward to the ground a wave signal having a frequency which periodically sweeps over a relatively narrow range of frequencies, that is, a range such that the frequency of the transmitted signal changes by only a small per cent during each sweep. The altimeter then is responsive to the transmitted signal and to a signal reflected from the ground in response thereto for deriving from the transmitted and reflected signal a heterodyne signal having a frequency representative of the distance between the aircraft and the ground. The altimeter also includes an amplifier and limiter 18 coupled to the output circuit of the receiver mixer 12. The amplifier and limiter 18 is in turn coupled through a counter circuit 19 to an altitude indicator 20 which preferably comprises a direct-current meter calibrated in terms of altitude. The counter circuit 19 preferably is of the type described at pages 94–96 of the text "Frequency-Modulated Radar" by D. G. C. Luck, McGraw-Hill, 1949 and includes a pair of diodes 21, 22 coupled with opposite polarities to the output circuit of the amplifier and limiter 18 through a condenser 23 of relatively small value. The anode of the diode 21 is connected to the junction of a pair of cathode resistors 24 and 70 of a cathode-follower tube 71, to be mentioned subsequently, to provide a discharge path for the condenser 23. The cathode circuit of the diode 22 includes a resistor-condenser network comprising a resistor 25 and a parallel-connected storage condenser 26 of large value relative to the condenser 23. The resistor-condenser network 25, 26 preferably has a time constant which is long with respect to the period of the heterodyne signal derived by the receiver mixer 12. A filter network comprising a series resistor 27 and a shunt condenser 28 is coupled across the resistor-condenser network 25, 26 to reduce the amplitude of any ripple frequency components in the output signal of the counter circuit. The filter network 27, 28 is connected to the control electrode of the cathode-follower tube 71 which has its anode connected to a suitable source of positive potential +B and its cathode coupled through resistors 24 and 70 to a suitable source of negative potential —B. The cathode-follower stage preferably has a low output impedance and the cathode resistors thereof are connected to the altitude indicator 20 for applying thereto a unidirectional signal having a magnitude representative of the altitude of the aircraft. The counter circuit 19 is also coupled to an input circuit of a computer 29 which will be described subsequently.

The system further includes circuit means coupled to the aforesaid responsive circuit for sampling the phase-time characteristic of the signal derived by the receiver mixer 12 for developing a signal representative of the magnitude of the predetermined component of velocity. This circuit means preferably includes a control circuit for developing a control signal representative of the aforementioned predetermined reference times. More particularly, the control circuit comprises a gating-pulse generator coupled to the altimeter and operatively synchronized therewith for generating a gating pulse at a predetermined reference time after the initiation of each periodic frequency sweep of the transmitted signal, each of the gating pulses preferably having a duration short with respect to the period of the heterodyne signal derived by the receiver mixer 12. The duration of a gating pulse may, for example, be 8 microseconds. The control circuit preferably is coupled to the first signal source and is operatively synchronized therewith. Specifically, the control circuit comprises an amplifier and limiter 30 of conventional construction which is coupled to an output circuit of the multivibrator 16 through a wave-shaping network comprising the series combination of a coupling condenser 31 and resistors 32 and 33, the junction of the resistors being coupled through a resistor 34 to a source of positive potential +B. The control circuit also includes a suitable differentiating circuit 35 which is coupled to the output circuit of the amplifier and limiter 30.

The circuit means for developing a signal representing the magnitude of the predetermined component of velocity preferably also includes a signal-translating device comprising a normally nonconductive electron tube 36 which is coupled to the control circuit comprising the elements 30–35, inclusive, and to the deriving circuit comprising the receiver mixer 12 and which is responsive jointly to the control signal representative of the predetermined reference times and to the signal derived by the receiver mixer 12, for developing therefrom a signal representative of the aforesaid rate of change of phase of the derived signal and thus of the magnitude of the predetermined component of velocity. More particularly, the tube 36 has an outer signal input electrode 37 coupled to the differentiating circuit 35 through a coupling condenser 60 and a grid-leak resistor 61 which is connected to a source of negative bias —B'. The cathode 38 and an inner signal input electrode 39 of the tube 36 are coupled across the output circuit of the amplifier and limiter 18 through a coupling condenser 40 and a grid-leak resistor 41 which is connected to a source of negative bias —B". The anode of the tube 36 is coupled through a suitable load resistor 42 to a source of positive potential +B while the screen electrode of the tube 36 is coupled to a suitable source of positive potential indicated as +B'.

The system preferably also includes an amplitude detector which is responsive to the output signal of the tube 36 for providing a detected signal having a frequency representative of the above-mentioned rate of change of phase of the signal derived by the receiver mixer 12 and thus of the magnitude of the predetermined component of velocity. This detector comprises a detector 44 of conventional construction which is coupled to the output circuit of the tube 36. The output circuit of the detector 44 is coupled through a suitable amplifier and limiter 45 to a counter circuit 46 which is responsive to the groups of pulses derived in the output circuit of the tube 36 for developing a unidirectional potential having a magnitude determined by the group repetition frequency. The counter circuit 46 is similar in construction to the counter circuit 19 and includes a pair of diodes 47, 48 coupled with opposite polarities to the output circuit of the amplifier and limiter 45 through a coupling condenser 49. The cathode of the diode 47 is connected to the junction of a pair of cathode resistors 50 and 72 of a cathode-follower tube 73, to be mentioned subsequently, to provide a charging path for the condenser 49. The anode circuit of the diode 48 includes a resistor-condenser network comprising a parallel-connected resistor 51 and condenser 52 and having a time constant which is long with respect to the period of the output signal of the detector 44. The condenser 52 preferably is large in value relative to the condenser 49. A filter network comprising a series resistor 53 and a shunt condenser 54 is coupled across the resistor-condenser network 51, 52 to reduce the amplitude of any ripple frequency components in the output signal of the counter circuit 46 so that its signal output is a unidirectional potential having a magnitude representative of the magnitude of the predetermined component of velocity. The filter network 53, 54 is connected to the control electrode of the cathode-follower tube 73 which has its anode coupled to a suitable source of positive potential +B and its cathode coupled to a suitable source of negative potential −B‴.

The output circuit of the counter circuit 46 is coupled to a velocity indicator 55 which is responsive to the magnitude of the unidirectional potential just mentioned for indicating the magnitude of the predetermined component of velocity. The velocity indicator 55 preferably comprises a direct-current meter calibrated in terms of velocity and may be similar to that of the altitude indicator 20. The output circuit of the counter circuit 46 is also coupled to the computer 29 which is responsive to the unidirectional signal derived from the heterodyne signal developed by the receiver mixer 12 and to the unidirectional signal derived from the groups of pulses developed in the output circuit of the tube 36, for deriving therefrom a signal representative of deviations of the aircraft from a desired flight path. The computer 29 may be of a well-known type which provides an output signal in accordance with the equation:

$$K_0 A + K_1 \frac{dA}{dt} + K_2 \frac{d^2 A}{dt^2} = ZI$$

where $A$ = altitude of the aircraft
$t$ = time
$K_0$, $K_1$, $K_2$ = constants determined by the desired flight path
$Z$ = impedance of the computer load circuit
$I$ = output current of the computer Such a computer may be constructed as described at pages 643–645, inclusive, and pages 648–650, inclusive, of volume 19, entitled Waveforms, of the Massachusetts Institute of Technology Series, edited by Chance, Hughes, MacNichol, Sayre and Williams, McGraw-Hill, 1949. The computer 29 ordinarily is coupled to an automatic pilot or to a suitable meter (not shown) which is responsive to the output signal of the computer to aid the pilot in the navigation of the aircraft.

*Operation of Fig. 1 system*

The operation of the Fig. 1 system and the results obtained thereby may best be understood by referring to Fig. 2 which is a graph representing the amplitude-time and frequency-time characteristics of the output signals of various units of the Fig. 1 receiver. Curve A represents the output signal of the multivibrator 16 of rectangular wave form and having a frequency of, for example, 1,000 cycles per second. The unit 17 integrates the output signal of the multivibrator 16 to provide a modulating signal of triangular wave form, as represented by curve B, which is applied to a suitable modulating circuit of the transmitter oscillator 13 to sweep the frequency of the output signal of the oscillator 13 over a range of frequencies such as a 30 megacycle range, as represented by solid-line curve C. The center frequency of the frequency range represented as $f_c$ may be of the order of 4,300 megacycles.

The output of the transmitter oscillator 13 is radiated by the antenna system 14 and preferably is transmitted vertically downward to the ground which reflects a signal to the airborne system where the antenna system 15 intercepts the reflected signal and applies it to the receiver mixer 12. The frequency-time characteristic of the reflected signal as intercepted by the antenna system 15 is represented by the dashed-line curve D. A portion of the transmitted signal is also applied by the transmission line 10, 11 to the receiver mixer 12 wherein it beats with the reflected signal applied to the mixer by the antenna system 15. It will be seen from curves C and D that the instantaneous frequency of the reflected signal differs from the frequency of the transmitted signal and, thus, through the well-known heterodyne action, the mixer 12 derives from the transmitted and reflected signals a heterodyne signal represented by curve E and which has a frequency equal to the instantaneous difference between the frequencies of the transmitted and reflected signals. Accordingly, the frequency of the heterodyne signal derived by the mixer 12 is proportional to the altitude of the aircraft since the difference between the frequencies of the transmitted and reflected signals varies directly with the time required for a wave signal to travel from the aircraft to the ground and to return to the aircraft.

The frequency of the heterodyne signal represented by curve E may vary, for example, from zero to 40 kilocycles over an altitude range of, for example, zero to 200 feet. The signal usually is also amplitude-modulated due to nonlinearities in the operation of the transmitter oscillator 13. Any amplitude modulation is eliminated, however, when the heterodyne signal is translated by the amplifier and limiter 18 which amplifies and limits the signal represented by curve E to provide a signal of substantially rectangular wave form as represented by curve F.

The output signal of the amplifier and limiter 18 is applied to the counter circuit 19 which functions in a well-known manner to derive a unidirectional potential across the condenser 28 having a magnitude representative of the frequency of the output signal of the amplifier and limiter 18 and, hence, representative of the altitude of the aircraft. Briefly considering the operation of the counter circuit 19, during the interval of each negative half cycle of the output signal of the amplifier and limiter 18 the condenser 23 of the counter circuit charges through the diode 21 and the cathode circuit of the cathode-follower tube 71. The condenser 23 then discharges through the diode 22 into the condenser 26 during the interval of each succeeding positive half cycle of the output signal of the unit 18. The change in voltage developed across the condenser 26 is small, however, relative to the change in voltage of the condenser 23 because of the relative values of the condensers. The time constant of the resistor-condenser network 25, 26 is such that the condenser 26 discharges a small amount through the resistor 25 during the interval of each negative half cycle of the output signal of the unit 18. When the charge on the condenser 26 reaches such a value that the average charging current flowing into the condenser 26 equals the average discharging current flowing out of the condenser 26 through the resistor 25, the average voltage across the condenser 26 remains constant. The magnitude of this average voltage varies with variations in the frequency of the output signal of the unit 18. Accordingly, there is developed across the condenser 26 a unidirectional potential having a magnitude representative of the frequency of the output signal of the unit 18 and, thus, representative of the altitude of the aircraft. This unidirectional potential is filtered by the network 27, 28 to reduce the magnitude of the ripple frequency components therein and is then applied by the condenser 28 to the control electrode of the cathode-follower tube 71 which develops a corresponding potential across the cathode resistor 24 thereof. The potential developed across the resistor 24 is applied to the anode of the diode 21 to vary the bias on that diode in accordance with variations in the magnitude of the output signal of the counter circuit 19 and thus to impart to the counter circuit an approximately linear mode of operation over a wide range of operating frequencies as explained in the above-mentioned Luck text. The unidirectional potential developed across the cathode resistor 24 then has a magnitude which issubstantially proportional to the altitude of the aircraft. This potential is applied by the resistor 24 to the altitude indicator 20 which provides a visible indication of altitude. The unidirectional potential derived by the counter circuit 19 is also applied to the computer 29 wherein it is utilized in a manner to be explained subsequently.

The frequency of the heterodyne signal derived by the receiver mixer 12 and, hence, the frequency of the output signal of the amplifier and limiter 18, is determined by the altitude of the aircraft and by the rate at which the frequency of the output signal of the transmitter oscillator 13 sweeps across its frequency range. On the other hand, the phase of the reflected signal intercepted by the antenna system 15, relative to the phase of the signal transmitted by the transmitter oscillator 13 at any instant after the initiation of a frequency sweep of the transmitted signal and, hence, the phase of the heterodyne signal at that instant, is determined by the altitude of the aircraft and by the instantaneous frequency of the transmitted signal. Accordingly, when the aircraft is traveling at a fixed altitude, the phase of the heterodyne signal is the same at each of predetermined reference times which are individually delayed by a predetermined time interval from the initiation of a recurrent frequency sweep of the transmitted signal, since the frequency of the transmitted signal is the same at each of such predetermined reference times.

When the altitude of the aircraft changes by one-half wave length at the frequency of the transmitted signal, the phase of the heterodyne signal at the predetermined reference times changes by 360° since the wave-signal transmission path from the aircraft to the ground and return changes by one wave length. When the altitude of the aircraft changes by amounts other than one-half wave length, the phase of the heterodyne signal at the reference times changes accordingly in the proportion of a change of phase of 360° at the reference time for each one-half wave length change in altitude. Accordingly, a signal which is representative of the rate of change of phase of the heterodyne signal from one predetermined reference time to another also is representative of the vertical component of velocity of the aircraft.

The vertical component of velocity of the aircraft may ordinarily be determined with sufficient accuracy by determining the altitude changes of the aircraft in one-quarter wave length increments at the frequency of the transmitted signal. Accordingly, the distance between the aircraft and the ground may be considered as being divided into strata one-quarter wave length in height, the phase of the heterodyne signal at the reference times changing 180° as the aircraft passes from one stratum to the next. The rate at which the phase of the heterodyne signal changes, as determined in 180° increments, then represents the rate at which the aircraft passes from one quarter wave length stratum to the next and that rate in turn represents the vertical component of velocity.

To develop a signal representative of the rate of change of phase of the heterodyne signal from one predetermined reference time to another after the initiation of a recurrent frequency sweep of the transmitted signal, a signal comprising negative pulses, represented by curve G, developed in the multivibrator 16 is applied thereby to the wave-shaping network 31–34, inclusive, which develops across the resistors 32 and 33 as a result of input circuit current flow of the unit 30 a signal also comprising negative pulses as represented by curve H. The signal represented by curve G may have a repetition frequency of 1,000 cycles per second, corresponding to the frequency of the output signal of the multivibrator represented by curve A. The signal represented by curve H has the same repetition frequency, for example, 1,000 cycles per second, but has a steeper wave form and a shorter duration than the signal represented by curve G. The signal represented by curve H is applied to the amplifier and limiter 30 which derives therefrom a signal comprising negative rectangular pulses represented by curve I, these pulses being synchronized with the initiations of the periodic frequency sweeps of the transmitted signal. This signal is applied to the differentiating circuit 35 wherein it is differentiated to derive a negative pulse from each leading edge of the negative pulses of curve I and a positive pulse from each trailing edge thereof. The derived negative and positive pulses are represented by curve J and are applied to the outer signal electrode 37 of the tube 36. The positive pulses represented by curve J are gating pulses which establish the predetermined reference times mentioned above by conditioning the tube 36 to conduct during the intervals of those pulses.

The output signal of the amplifier and limiter 18 represented by curve F is also applied to the inner control electrode 39 of the tube 36. The tube 36 is rendered conductive jointly by the control signal represented by curve J and the derived signal represented by curve F at those of the predetermined reference times when the control signal and the derived signal have a predetermined phase relation for developing therefrom groups of pulses having a group repetition frequency representative of the magnitude of the predetermined component of velocity. More particularly, the tube 36 is so biased that the tube conducts only when the gating pulses applied to the electrode 37 by the differentiating circuit 35 and the heterodyne signal derived by the receiver mixer 12 have a predetermined phase relation, namely, a phase relation such that the gating pulses occur during the intervals of the positive half cycles of the output signal of the amplifier and limiter 18. Accordingly, a signal comprising the negative pulses represented by curve K, occurring at times $t_1$ and $t_2$, is developed in the output circuit of the tube 36. These pulses have a repetition frequency the same as that of curves A and G, for example, 1,000 cycles per second, and recur at that rate continuously while the aircraft is flying at a fixed altitude such that the positive pulses represented by curve J occur during the intervals of the positive half cycles of the signal represented by curve F.

When the altitude of the aircraft changes by one-quarter wave length, however, the phase of the heterodyne signal represented by curve E changes 180° at the reference times identified with the gating pulses of curve J. Hence, the gating pulses represented by curve J then occur during the intervals of negative half cycles of the signal represented by curve F. Accordingly, so long as the aircraft continues to fly at the altitude just mentioned, no output pulses such as those represented by curve K are derived in the output circuit of the tube 36. Thus, assuming that the aircraft is descending, while the aircraft is within a given one-quarter wave length stratum, the gating pulses represented by curve J occur during intervals of the positive half cycles of the signal represented by curve F and thus the pulses represented by curve K recur at a 1,000 cycle rate. When the aircraft passes into the adjacent one-quarter wave length stratum, however, and the gating pulses represented by curve J occur during the negative half cycles of the signal represented by curve F, no output pulses are derived in the output circuit of the tube 36. When the aircraft descends another one-quarter wave length, the gating pulses represented by curve J again occur during the intervals of the positive half cycles of the signal represented by curve F and the pulses of curve K, having a repetition frequency of 1,000 cycles, again occur in the output circuit of the tube 36.

Accordingly, curve L represents the output signal developed in the output circuit of the tube 36 while the aircraft is descending at a constant velocity. The signal represented by curve L comprises groups of pulses, such as the pulses represented by curve K but drawn on a greatly reduced time scale, the first two pulses represented by curve L as occurring at the times $t_1$ and $t_2$ corresponding to the first two pulses of curve K. The group repetition frequency of the groups of pulses represented by curve L is proportional to the vertical component of velocity of the aircraft with respect to ground, since the vertical component of velocity of the aircraft determines the rate at which the aircraft descends from one one-quarter wave length stratum to the next. This frequency may, for example, vary from 9 cycles per second when the vertical component of velocity is 1 foot per second to 180 cycles per second when the vertical component of velocity is 20 feet per second.

The pulses represented by curve L are applied to the detector 44 which develops therefrom a negative output signal of serrated wave form as represented by curve M. This signal is in turn applied to the amplifier and limiter 45 wherein it is amplified and limited to provide a signal of rectangular wave form as represented by curve N. The signal represented by curve N has a frequency corresponding to the group repetition frequency of the pulses represented by curve L and, hence, the frequency of the signal represented by curve N is representative of the vertical component of the velocity of the aircraft. This signal is applied by the amplifier and limiter 45 to the counter circuit 46 which operates in a manner similar to the operation of a counter circuit 19. During the interval of each positive half cycle of the signal represented by curve N the condenser 49 charges through the diode 47 and the cathode circuit of the cathode-follower tube 73, and during the interval of each succeeding negative half cycle that condenser discharges through the diode 48 into the condenser 52. The change in voltage developed across the condenser 52 is small, however, relative to the change in voltage of the condenser 49 because of the relative values of these condensers. The time constant of the resistor-condenser network 51, 52 is such that the condenser 52 discharges a small amount through the resistor 51 during the interval of each positive half cycle of the signal represented by curve N. When the charge on the condenser 52 reaches such a value that the average charging current flowing into the condenser 52 equals the average discharging current flowing out of the condenser 52 through the resistor 51, the average voltage across the condenser 52 remains constant. The magnitude of this average voltage varies with variations in the frequency of the output signal of the unit 45. Accordingly, there is developed across the condenser 52 a negative unidirectional potential having a magnitude determined by the frequency of the output signal of the amplifier and limiter 45. This unidirectional potential is filtered by the filter network comprising the resistor 53 and the condenser 54 to reduce the magnitude of the ripple frequency component therein. The potential developed across the condenser 54 is applied to the control electrode of the cathode-follower tube 73 which develops a corresponding potential across the cathode resistor 50 thereof. The potential developed across the resistor 50 is applied to the cathode of the diode 47 to vary the bias on the diode 47 in accordance with variations in the magnitude of the output signal of the counter circuit 46 and thus to impart an approximately linear mode of operation to the counter circuit over a wide range of operating frequencies as explained in the above-mentioned Luck text. Accordingly, a negative unidirectional potential having a magnitude which is substantially proportional to the vertical component of velocity of the aircraft is applied by the counter circuit 46 to the velocity indicator 55 which indicates the magnitude of the vertical component of velocity. The output signal of the counter circuit 46 is also applied to the computer 29 which may derive therefrom a signal representative of the acceleration of the aircraft. The computer responds to the signals representing velocity and acceleration and the signal representing altitude applied thereto by the counter circuit 19 to develop a signal representative of the deviation of the aircraft from a desired flight path which may, for example, be a landing path. As mentioned previously the computer may be coupled to a suitable meter to aid the pilot in navigating the aircraft or may develop an output signal which is applied to an automatic pilot to control the flight of the aircraft.

From the foregoing description of the invention, it will be apparent that a system constructed in accordance with the invention for developing a signal representative of the magnitude of a predetermined component of the velocity of the system with respect to a relatively moving object has the advantage that it will respond to a signal derived by an altimeter of the frequency-modulated wave-signal reflection type to provide a signal which accurately represents velocity.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for developing a signal representative of the magnitude of a predetermined component of the velocity of the system with respect to a relatively moving object comprising: a transmitter for transmitting to said object a wave signal having a frequency which periodically sweeps over a narrow range of frequencies; an antenna for intercepting a wave signal returned from said object in response to said transmitted signal; a receiver mixer responsive jointly to said transmitted and returned signals for deriving therefrom a heterodyne signal having a frequency proportional to the distance between said system and said object; a gating-pulse generator operatively synchronized with said transmitter for generating a gating pulse at a predetermined reference time after the initiation of each periodic frequency sweep of said transmitted signal; and a normally nonconductive electron tube, having a control electrode-cathode circuit coupled to said gating pulse generator and another control electrode-cathode circuit coupled to said receiver mixer, rendered conductive jointly by said gating pulses and said derived signal at those of said reference times when said gating pulses and said derived signal have a predetermined phase relation for developing therefrom groups of pulses having a group repetition frequency representative of said magnitude of said predetermined component velocity.

2. A system for developing a signal representative of the magnitude of a predetermined component of the velocity of the system with respect to a relatively moving object comprising: a first wave-signal source having a frequency which recurrently sweeps over a range of frequencies; circuit means for supplying a second wave signal having a frequency which recurrently sweeps over said frequency range and which differs instantaneously from the frequency of said first signal by an amount representative of the distance between said system and said object; a circuit responsive jointly to said signals for deriving therefrom a signal having a frequency representative of said distance and having a rate of change of phase from one predetermined reference time occurring during one of said sweeps of said first signal to another reference time occurring during another of said sweeps thereof representative of said magnitude of said component of velocity; and circuit means coupled to said responsive circuit for sampling the phase of said derived signal at said reference times to develop a signal representative of said rate of change of phase of said derived signal and thus representing said magnitude of said component of velocity.

3. A system for developing a signal representative of the magnitude of a predetermined component of the velocity of the system with respect to a relatively moving object comprising: a transmitter for transmitting to said object a wave signal having a frequency which recurrently sweeps over a range of frequencies; an antenna for intercepting a wave signal returned from said object in response to said transmitted signal and having a frequency which differs instantaneously from the frequency of said first signal by an amount representative of the distance between said system and said object; a receiver responsive jointly to said signals for deriving therefrom a signal having a frequency representative of said distance and having a rate of change of phase from one predetermined reference time occurring during one of said sweeps of said first signal to another reference time occurring during another of said sweeps thereof representative of said magnitude of said component of velocity; and circuit means coupled to said responsive circuit for sampling the phase of said derived signal at said reference times to develop a signal representative of said rate of change of phase of said derived signal and thus representing said magnitude of said component of velocity.

4. A system for developing a signal representative of the magnitude of a predetermined component of the velocity of the system with respect to a relatively moving object comprising: a first wave-signal source having a frequency which recurrently sweeps over a range of frequencies; circuit means for supplying a second wave signal having a frequency which recurrently sweeps over said frequency range and which differs instantaneously from the frequency of said first signal by an amount proportional to the distance between said system and said object; a mixer responsive jointly to said signals for deriving therefrom a heterodyne signal having a frequency proportional to said distance and having a rate of change of phase from one predetermined reference time occurring during one of said sweeps of said first signal to another reference time occurring during another of said sweeps thereof proportional to said magnitude of said component of velocity; and circuit means coupled to said responsive circuit for sampling the phase of said derived signal at said reference times to develop a signal representative of said rate of change of phase of said derived signal and thus representing said magnitude of said component of velocity.

5. A system for developing a signal representative of the magnitude of a predetermined component of the velocity of the system with respect to a relatively moving object comprising: a first wave-signal source having a frequency which recurrently sweeps over a range of frequencies; circuit means for supplying a second wave signal having a frequency which recurrently sweeps over said frequency range and which differs instantaneously from the frequency of said first signal by an amount representative of the distance between said system and said object; a circuit responsive jointly to said signals for deriving therefrom a signal having a frequency representative of said distance and having a rate of change of phase from one predetermined reference time to another representative of said magnitude of said component of velocity, each of said reference times being delayed by a predetermined time interval from the initiation of a recurrent frequency sweep of said first signal; and circuit means coupled to said responsive circuit for sampling the phase of said derived signal at said reference times to develop a signal representative of said rate of change of phase of said derived signal and thus representing said magnitude of said component of velocity.

6. A system for developing a signal representative of the magnitude of a predetermined component of the velocity of the system with respect to a relatively moving object comprising: a first wave-signal source having a frequency which recurrently sweeps over a range of frequencies; circuit means for supplying a second wave signal having a frequency which recurrently sweeps over said frequency range and which differs instantaneously from the frequency of said first signal by an amount representative of the distance between said system and said object; a circuit responsive jointly to said signals for deriving therefrom a signal having a frequency representative of said distance and having a rate of change of phase from one predetermined reference time to another representative of said magnitude of said component of velocity; a control circuit coupled to said first source and operatively synchronized therewith for developing a control signal representative of said reference times; and a signal-translating device coupled to said control circuit and to said deriving circuit and responsive jointly to said control signal and said derived signal for developing therefrom a signal representative of said rate of change of phase of said derived signal and thus representing said magnitude of said component of velocity.

7. A system for developing a signal representative of the magnitude of a predetermined component of the velocity of the system with respect to a relatively moving object comprising: a first wave-signal source having a frequency which recurrently sweeps over a range of frequencies; a timing circuit coupled to said source for controlling the timing of said recurrent frequency sweeps; circuit means for supplying a second wave signal having a frequency which recurrently sweeps over said frequency range and which differs instantaneously from the frequency of said first signal by an amount representative of the distance between said system and said object; a circuit responsive jointly to said signals for deriving therefrom a signal having a frequency representative of said distance; a gating-pulse generator coupled to said timing circuit for generating a gating pulse at a predetermined reference time after the initiation of each recurrent frequency sweep of said first signal; and a signal-translating device coupled to said gating-pulse generator and to said deriving circuit and responsive jointly to said gating pulses and said derived signal for developing therefrom a signal representative of the rate of change of phase of said derived signal from one of said predetermined reference times to another and thus representing said magnitude of said component of velocity.

8. A system for developing a signal representative of the magnitude of a predetermined component of the velocity of the system with respect to a relatively moving object comprising: a first wave-signal source having a frequency which recurrently sweeps over a range of frequencies; a timing circuit coupled to said source for controlling the timing of said recurrent frequency sweeps; circuit means for supplying a second wave signal having a frequency which recurrently sweeps over said frequency range and which differs instantaneously from the frequency of said first signal by an amount representative of the distance between said system and said object; a circuit responsive jointly to said signals for deriving therefrom a signal having a frequency representative of said distance and having a rate of change of phase from one predetermined reference time to another representative of said magnitude of said component of velocity; a gating-pulse generator coupled to said timing circuit for generating at said reference times gating pulses individually having a duration short with respect to the period of said derived signal; and a signal-translating device coupled to said gating-pulse generator and to said deriving circuit and responsive jointly to said gating pulses and said derived signal for developing therefrom a signal representative of said rate of change of phase of said derived signal and thus representing said magnitude of said component of velocity.

9. A system for developing a signal representative of the magnitude of a predetermined component of the velocity of the system with respect to a relatively moving object comprising: a first wave-signal source having a frequency which recurrently sweeps over a range of frequencies; a timing circuit coupled to said source for controlling the timing of said recurrent frequency sweeps; circuit means for supplying a second wave signal having a frequency which recurrently sweeps over said frequency range and which differs instantaneously from the frequency of said first signal by an amount representative of the distance between said system and said object; a circuit responsive jointly to said signals for deriving therefrom a signal having a frequency representative of said distance and having a rate of change of phase from one predetermined reference time to another representative of said magnitude of said component of velocity; a control circuit coupled to said timing circuit for developing a control signal representative of said reference times; and a normally non-electron tube coupled to said control circuit and to said deriving circuit and rendered conductive jointly by said control signal and said derived signal for developing therefrom a signal representative of said rate of change of phase of said derived signal and thus representing said magnitude of said component of velocity.

10. A system for developing a signal representative of the magnitude of a predetermined component of the velocity of the system with respect to a relatively moving object comprising: a first wave-signal source having a frequency which recurrently sweeps over a range of frequencies; a timing circuit coupled to said source for controlling the timing of said recurrent frequency sweeps; circuit means for supplying a second wave signal having a frequency which recurrently sweeps over said frequency range and which differs instantaneously from the frequency of said first signal by an amount representative of the distance between said system and said object; a circuit responsive jointly to said signals for deriving therefrom a signal having a frequency representative of said distance and having a rate of change of phase from one predetermined reference time to another representative of said magnitude of said component of velocity; a control circuit coupled to said timing circuit for developing a control signal representative of said reference times; and a normally nonconductive electron tube, having one control electrode coupled to said control circuit and another control electrode coupled to said deriving circuit, rendered conductive jointly by said control signal and said derived signal at those of said reference times when said control signal and said derived signal have a predetermined phase relation for developing therefrom a signal representative of said rate of change of phase of said derived signal and thus representing said magnitude of said component of velocity.

11. A system for developing a signal representative of the magnitude of a predetermined component of the velocity of the system with respect to a relatively moving object comprising: a first wave-signal source having a frequency which recurrently sweeps over a range of frequencies; circuit means for supplying a second wave signal having a frequency which recurrently sweeps over said frequency range and which differs instantaneously from the frequency of said first signal by an amount representative of the distance between said system and said object; a circuit responsive jointly to said signals for deriving therefrom a signal having a frequency representative of said distance and having a rate of change of phase from one predetermined reference time occurring during one of said sweeps of said first signal to another reference time occurring during another of said sweeps thereof representative of said magnitude of said component of velocity; circuit means coupled to said responsive circuit for sampling the phase of said derived signal at said reference times to develop an output signal representative of said rate of change of phase of said derived signal; and an amplitude detector responsive to said output signal for providing a detected signal having a frequency representative of said rate of change of phase of said derived signal and thus representing said magnitude of said component of velocity.

12. A system for indicating the magnitude of a predetermined component of the velocity of the system with respect to a relatively moving object comprising: a first wave-signal source having a frequency which recurrently sweeps over a range of frequencies; circuit means for supplying a second wave signal having a frequency which recurrently sweeps over said frequency range and which differs instantaneously from the frequency of said first signal by an amount representative of the distance between said system and said object; a circuit responsive jointly to said signals for deriving therefrom a signal having a frequency representative of said distance and having a rate of change of phase from one predetermined reference time occurring during one of said sweeps of said first signal to another reference time occurring during another of said sweeps thereof representative of said magnitude of said component of velocity; circuit means coupled to said responsive circuit for sampling the phase of said derived signal at said reference times to develop therefrom groups of pulses having a group repetition frequency representative of said rate of change of phase of said derived signal and thus representing said magnitude of said component of velocity; a counter circuit responsive to said groups of pulses for developing a unidirectional potential having a magnitude determined by said group repetition frequency; and an indicator responsive to said magnitude of said unidirectional potential for indicating said magnitude of said component of velocity.

13. A system for developing a signal representative of the magnitude of a predetermined component of the velocity of the system with respect to a relatively moving object comprising: a first wave-signal source having a frequency which recurrently sweeps over a range of frequencies; circuit means for supplying a second wave signal having a frequency which recurrently sweeps over said frequency range and which differs instantaneously from the frequency of said first signal by an amount representative of the distance between said system and said object; a circuit responsive jointly to said signals for deriving therefrom a signal having a frequency representative of said distance and having a rate of change of phase from one predetermined reference time occurring during one of said sweeps of said first signal to another reference time occurring during another of said sweeps thereof representative of said magnitude of said component of velocity; and circuit means coupled to said responsive circuit for sampling the phase-time characteristic of said derived signal during several sweeps to develop a signal representative of said magnitude of said component of velocity.

References Cited in the file of this patent

UNITED STATES PATENTS

| 2,268,587 | Guanella | Jan. 6, 1942 |
| 2,427,215 | Kihn | Sept. 9, 1947 |

FOREIGN PATENTS

| 656,094 | Great Britain | Aug. 15, 1951 |